(12) United States Patent
Sommerhalter, Jr.

(10) Patent No.: US 12,005,939 B2
(45) Date of Patent: Jun. 11, 2024

(54) BRAKE SYSTEM FOR TRACK AND MOVER SYSTEM

(71) Applicant: ROCKWELL AUTOMATION TECHNOLOGIES, INC., Mayfield Heights, OH (US)

(72) Inventor: Fred A. Sommerhalter, Jr., Devens, MA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 291 days.

(21) Appl. No.: 17/476,936

(22) Filed: Sep. 16, 2021

(65) Prior Publication Data
US 2023/0079695 A1    Mar. 16, 2023

(51) Int. Cl.
| | | |
|---|---|---|
| *B61K 7/12* | (2006.01) | |
| *B61B 13/12* | (2006.01) | |
| *B65G 23/22* | (2006.01) | |
| *F16D 63/00* | (2006.01) | |
| *F16D 65/092* | (2006.01) | |
| *F16D 125/66* | (2012.01) | |

(52) U.S. Cl.
CPC ............ *B61K 7/12* (2013.01); *B61B 13/12* (2013.01); *B65G 23/22* (2013.01); *F16D 63/008* (2013.01); *F16D 65/092* (2013.01); *F16D 2125/66* (2013.01); *F16D 2200/0004* (2013.01); *F16D 2200/0034* (2013.01); *F16D 2200/0056* (2013.01)

(58) Field of Classification Search
CPC .......... B61K 7/12; B61B 13/12; B65G 23/22; F16D 63/008; F16D 65/092; F16D 2125/66; F16D 2200/0004; F16D 2200/0034; F16D 2200/0056
See application file for complete search history.

(56) References Cited

U.S. PATENT DOCUMENTS 3,986,584 A * 10/1976 Wright .................... F16D 65/54
                                                       192/85.37
4,194,596 A *  3/1980 Garrett .................. F16D 65/567
                                                         188/366
(Continued)

FOREIGN PATENT DOCUMENTS

DE     10225353 A1 * 12/2003  ............. B60T 13/04
DE     10307224 A1 *  9/2004  ............. F16D 65/14
(Continued)

OTHER PUBLICATIONS

Extended European Search Report for Application No. 22194117.2 dated Feb. 6, 2023, 9 pages.

*Primary Examiner* — Vishal R Sahni
(74) *Attorney, Agent, or Firm* — Fletcher Yoder, P.C.

(57) ABSTRACT

The present disclosure describes a brake system for a track section of a linear motor system. The brake system includes a housing receiving a brake flag of a mover and a first brake pad disposed within the housing and having a first tapered surface. The brake system also includes a second brake pad disposed within the housing and having a second tapered surface and a wedge disposed within the housing and comprising a third tapered surface. The brake system also includes an actuator that moves the wedge, wherein movement of the activation wedge causes the first brake pad to move and causes the second brake pad to move.

20 Claims, 4 Drawing Sheets

(56) References Cited

U.S. PATENT DOCUMENTS

| | | | | |
|---|---|---|---|---|
| 4,819,564 | A * | 4/1989 | Brandis | H02K 41/03 |
| | | | | 188/38.5 |
| 6,305,506 | B1 * | 10/2001 | Shirai | B60T 7/042 |
| | | | | 188/72.3 |
| 6,446,769 | B1 | 9/2002 | Kangiser et al. | |
| 6,491,138 | B1 * | 12/2002 | Spagele | F16D 55/14 |
| | | | | 188/72.2 |
| 9,974,497 | B2 * | 5/2018 | Oh | A61B 6/032 |
| 2004/0099492 | A1 | 5/2004 | Onukl et al. | |
| 2006/0237268 | A1 | 10/2006 | Yajima et al. | |
| 2014/0299425 | A1 * | 10/2014 | Schautt | F16D 63/008 |
| | | | | 188/158 |
| 2015/0259175 | A1 * | 9/2015 | West | F16D 63/008 |
| | | | | 187/359 |
| 2017/0328425 | A1 * | 11/2017 | Kalra | B60T 13/665 |
| 2018/0223923 | A1 * | 8/2018 | Maehara | F16D 55/2245 |
| 2018/0237226 | A1 * | 8/2018 | Kacel | B65G 13/06 |
| 2019/0305661 | A1 | 10/2019 | Haya et al. | |
| 2022/0034374 | A1 * | 2/2022 | Mayer | F16D 65/16 |
| 2023/0079695 | A1 * | 3/2023 | Sommerhalter, Jr. | F16D 63/008 |

FOREIGN PATENT DOCUMENTS

| | | | | |
|---|---|---|---|---|
| DE | 102005053835 A1 * | 5/2007 | | F16D 55/2245 |
| EP | 0636561 A1 | 2/1995 | | |
| WO | WO-2006037986 A2 * | 4/2006 | | B23Q 1/28 |

\* cited by examiner

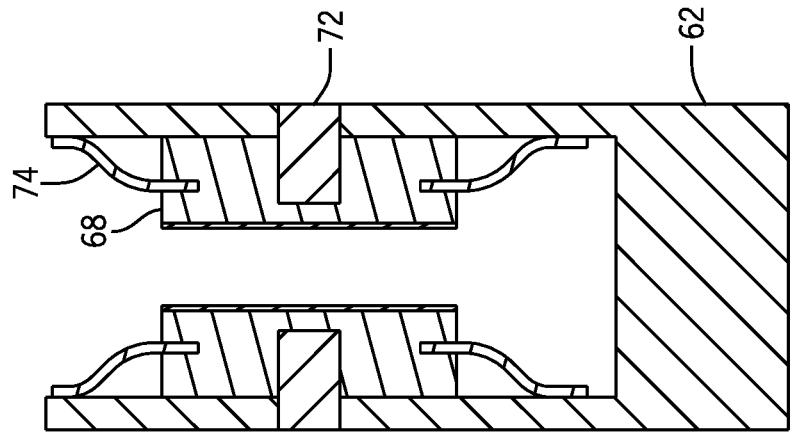
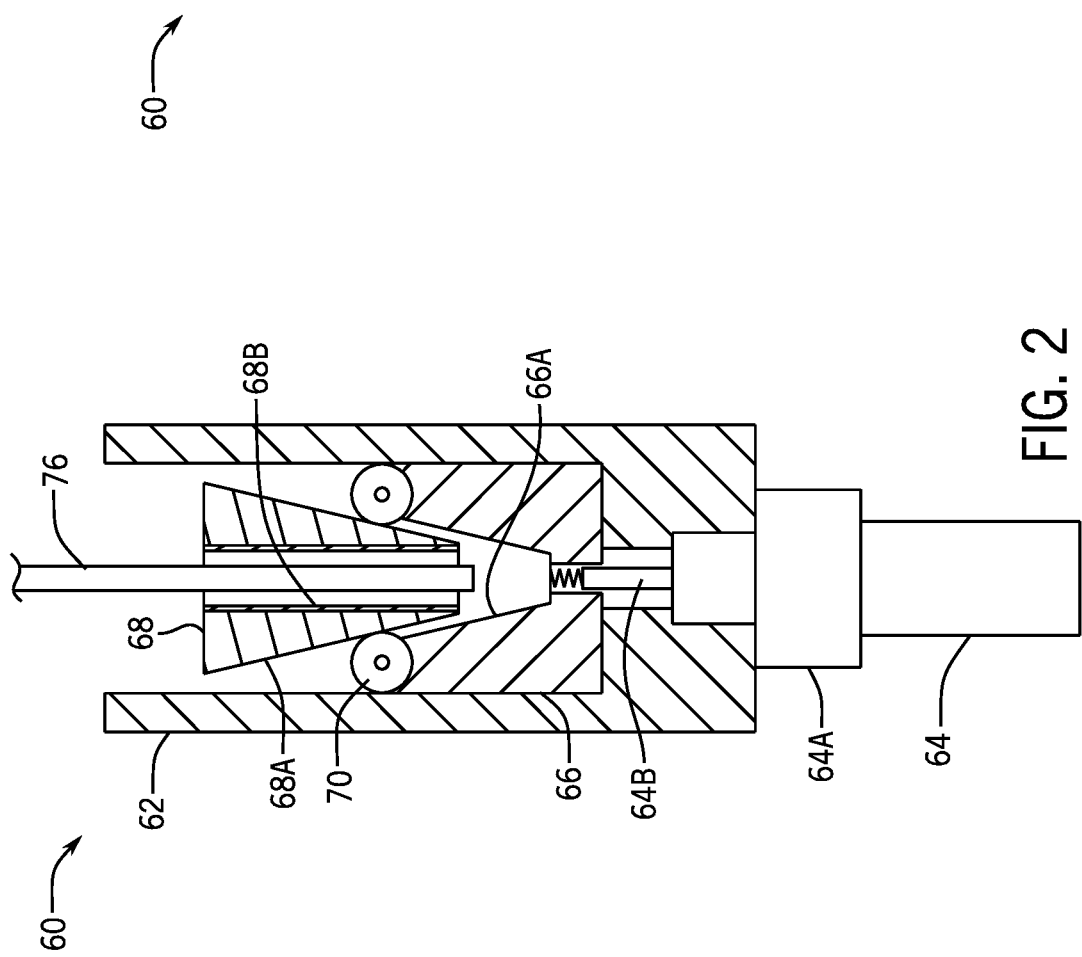

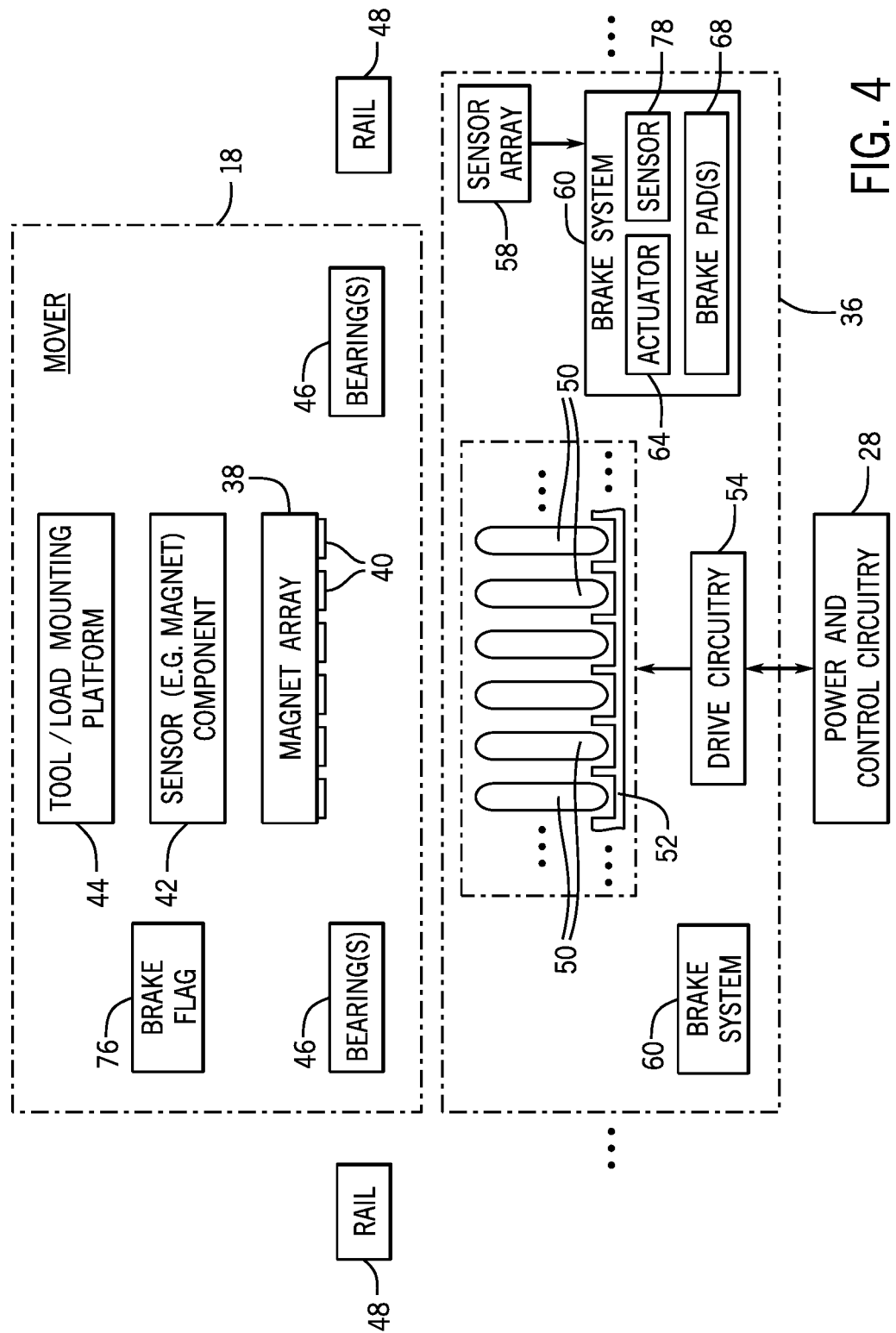

BRAKE SYSTEM FOR TRACK AND MOVER SYSTEM

BACKGROUND

The present disclosure relates generally to linear drive transport systems, and more particularly, to a brake system for movers in linear drive transport systems.

A range of linear motors are known and in use throughout industry, particularly in manufacturing, filling, and material handling applications. Such motors typically include an elongated track in which motor coils are associated with a stator core, such as a laminated core. The coils may have various orientations, depending upon the motor design. A permanent magnet mover may be placed on the track, and fields resulting from selective energization of the track coils interact with permanent magnets of the mover to cause the mover to move along the track in desired directions, speeds, and accelerations, and to stop and start at desired locations. Highly flexible and precise control of movement of one or many movers may be achieved by control and driver circuitry associated with the coils of the track sections.

Traditionally, the tracks utilized in linear drive transport systems may allow travel in any direction, such as straight sections, curved sections, horizontal sections, vertical sections, and so forth. For example, in traditional configurations, movers may travel up and down vertical portions of track. When the linear drive transport systems are shut off and powered down, the movers may quickly fall to the bottom of the vertical portions of the track, potentially damaging the movers and/or a corresponding load for the mover. Accordingly, as discussed herein, providing brake systems for track sections of the linear drive transport system may enable the linear drive transport system to retain the movers in place and prevent the movers and/or load from experiencing unintended movement, such as falling down a vertical portion of the track.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a brake system for a track section of a linear motor system includes a housing configured to receive a brake flag of a mover of the linear motor system and a first brake pad disposed within the housing and comprising a first tapered surface, wherein the first brake pad is configured to move between a first position and a second position, wherein the first brake pad is configured to engage the brake flag of the mover of the linear motor system in the second position. The brake system also includes a second brake pad disposed within the housing and comprising a second tapered surface, wherein the second brake pad is configured to move between a third position and a fourth position, wherein the second brake pad is configured to engage the brake flag of the mover of the linear motor system in the fourth position and a wedge disposed within the housing and comprising a third tapered surface configured to interface with the first tapered surface of the first brake pad and a fourth tapered surface configured to interface with the second tapered surface of the second brake pad. The brake system also includes an actuator configured to move the wedge between a fifth position and a sixth position, wherein movement of the activation wedge from the fifth position to the sixth position causes the first brake pad to move from the first position to the second position, and causes the second brake pad to move from the third position to the fourth position.

In another embodiment, a linear motor system includes a mover comprising a brake flag and a track section. The track section includes a plurality of coils configured to create a controlled magnetic field, wherein the mover is configured to be displaced by the controlled magnetic field and a brake system configured to engage the brake flag and configured to restrict movement of the mover along the track section.

In yet another embodiment, a linear motor system includes a mover having a brake flag. The linear motor system also includes a track section including a plurality of coils configured to create a controlled magnetic field, wherein the mover is configured to be displaced by the controlled magnetic field. The linear motor system also includes a brake system configured to engage the brake flag and configured to restrict movement of the mover along the track section.

DRAWINGS

These and other features, aspects, and advantages of the present disclosure will become better understood when the following detailed description is read with reference to the accompanying drawings in which like characters represent like parts throughout the drawings, wherein:

FIG. 2 is a cross-sectional view of an embodiment of a brake system for the linear motor systems of FIGS. 1A and 1B, in accordance with embodiments described herein;

FIG. 3 is a cross-sectional view of an embodiment of the brake system for the linear motor systems of FIGS. 1A and 1B, in accordance with embodiments described herein;

FIG. 4 is a diagrammatical representation of the linear motor systems of FIGS. 1A and 1B including a mover with the brake system of FIG. 2, in accordance with embodiments described herein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Figure 1A:
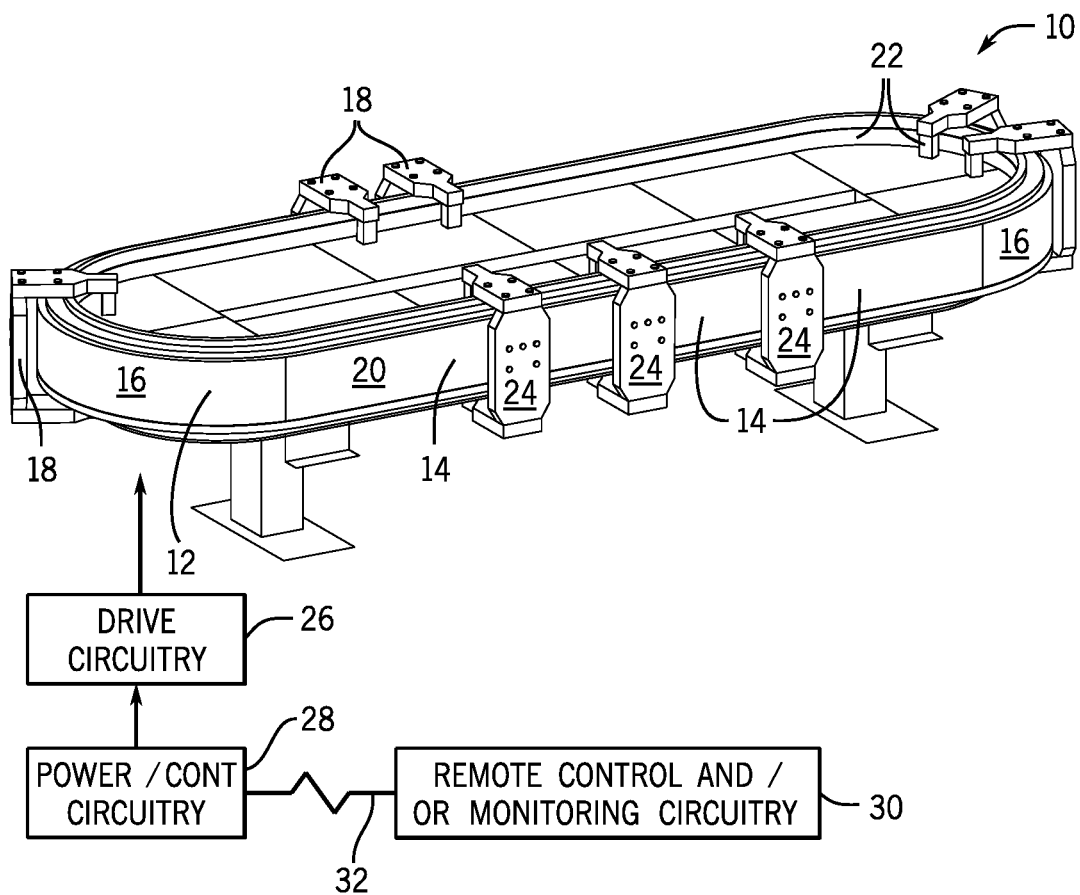
FIG. 1A is a perspective view of an exemplary linear motor system illustrating straight and curved track sections and several movers positioned for movement along the sections, in accordance with embodiments described herein.

Turning now to the drawings, and referring first to FIG. 1A, a linear motor system 10 as illustrated for moving articles or products around a track 12. As will be appreciated by those skilled in the art, in many applications, the linear motor system 10 may inter-operate with other machines, robots, conveyers, control equipment, and so forth (not separately shown) in an overall automation, packaging, material handling or other application. The linear motor system 10 may generally be referred to a "linear motor" as discussed below, in which the moving components are positioned, accelerated, decelerated, and generally moved under the influence of controlled magnetic and electromagnetic fields. In the illustrated embodiment, the track 12 comprises multiple straight track sections 14 and multiple curved track sections 16. These sections may be generally self-contained and mountable in various physical configurations, such as the oval illustrated in FIG. 1A. It should be noted that other configurations are also possible as discussed below. The configurations may form closed loops of various shapes, but may also include open-ended segments. The linear motor system 10 may also include one or more movers 18, which may be mounted to and movable along the track 12. Again, the position, velocity, acceleration, and higher order derivative parameters are controllable for these movers 18 by appropriate control of the coils of the system that are energized and de-energized. In the illustrated embodiment, the movers 18 interact with stationary elements in and around an outer periphery 20 of the track sections 16, although other configurations are envisaged. A sensor system 22 is provided to detect positions of the movers 18 around the track 12, and such sensor systems may include permanent magnets, energized coils, Hall effect sensors, or any other suitable devices. In general, one component of the sensor system 22 may be mounted on the movers 18, while another component may be mounted at fixed locations around the track 12.

Each mover 18 may include a mounting platform 24. In an actual implementation, various tools, holders, support structures, loads, and so forth may be mounted to this mounting platform 24. The movers 18 themselves may be configured differently from those shown in order accommodate the various loads. While a horizontal configuration is illustrated in FIG. 1A, other orientations may also be provided, such as ones in which the illustrated oval is generally stood on a side or end, or at any angle between.

The linear motor system 10 may also include circuitry for controlling a movement of the movers 18. In the embodiment illustrated in FIG. 1A, this circuitry may include drive circuitry 26 that provides signals to each track section 16, and specifically individual coils of the track sections 16 to create electromotive forces that interact with magnets on the track sections 16 to drive the movers 18 to specific locations, and at specific velocity, accelerations, and so forth. This drive circuitry 26 may typically include inverter circuitry that makes use of power electronic switches to provide drive power to the individual coils of each section in a controlled manner. In some embodiments, the drive circuitry 26 may be included in each individual track section 16, and signals provided to the drive circuitry 26 by power and control circuitry 28. This power and control circuitry 28 (and the drive circuitry 26) may receive feedback from the movers 18 and/or from the sensor system 22 to detect the location, velocity, acceleration, and so forth of each mover 18. In certain embodiments the movers 18 may also be recognized by the power and control circuitry 28 as individual axes that are independently controlled, but with regulation of their position, velocity, and acceleration to avoid conflicts, collisions, and so forth. The particular motion profile implemented by the power and control circuitry 28 may typically be implemented upon the design and commissioning of the linear motor system 10, depending upon the particular task to be performed. Finally, various remote control and/or monitoring circuitry 30 may be provided and may be linked to the linear motor system 10 by one or more networks 32. Such remote circuitry 30 may generally allow for coordination of the operation of the linear motor system 10 with other automation components, machine systems, manufacturing and material handling machines, and so forth.

Figure 1B:
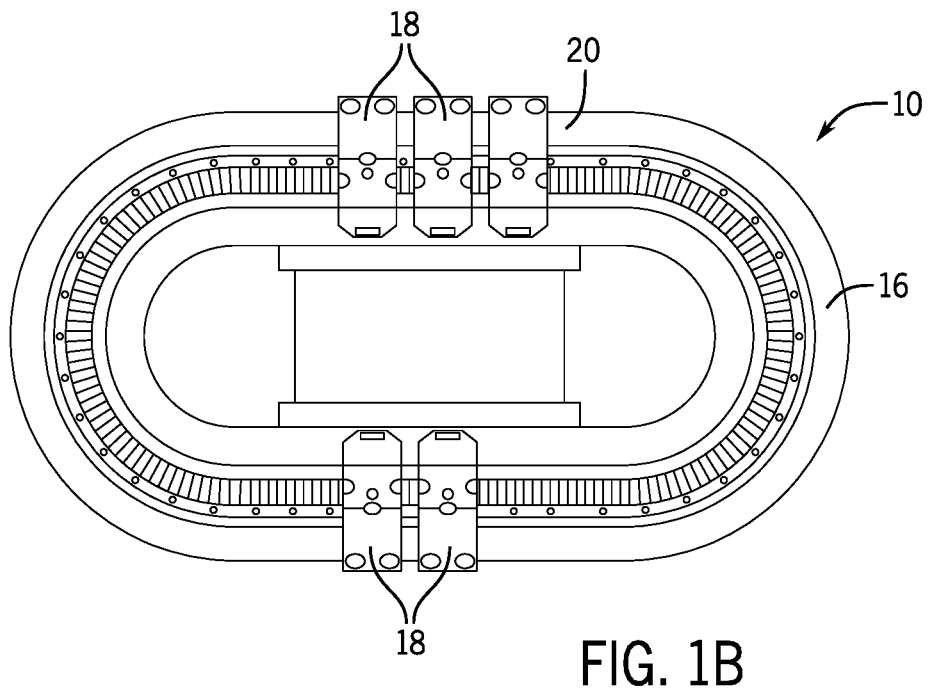
FIG. 1B is a top view of a similar linear motor system in which motor coils are positioned differently than in the system of FIG. 1A, in accordance with embodiments described herein.

FIG. 1B illustrates an alternative configuration for a similar linear motor system 10. However, in this configuration, rather than motor coils being positioned around the periphery of the system 10, coils are positioned around the top of the system 10, in a generally planar arrangement. Magnet assemblies of each mover 18 face these coils and are spaced from the coils by a small air gap. Straight and curved track sections are assembled, as above, to form an oval, although other shapes and layouts may be formed. The curved track sections may be adapted with modified spline geometries, as in the case of the system shown in FIG. 1A, and as described in greater detail below.

With the foregoing in mind, FIG. 2 illustrates a cross-sectional view of a brake system 60 for use with the linear motor system 10, in accordance with embodiments of the present disclosure. The brake system 60 may be incorporated into any number of track sections, such as track section 14, 16 shown in FIGS. 1A and 1B. In certain embodiments, each track section may include any number of brake systems 60 spaced apart along the corresponding track section. The brake system 60 may engage one or more movers 18 and may restrain the movers 18 along the track. The brake system 60 may include a housing 62 forming a portion of the track section. The housing 62 may have a U-shaped cross-section and may be formed of a metal material (e.g., aluminum, steel, titanium, etc.). The brake system 60 may include an actuator 64, such as a hydraulic cylinder, pneumatic cylinder, electric solenoid, linear actuator, servo, and so forth. The actuator 64 may be operable to move components of the brake system 60 between an engaged position and a disengaged position. For example, the actuator 64 may move one or more brake pads 68 into engagement with a brake flag 76 of a mover 18 and the one or more brake pads 68 may restrain the mover 18 (e.g., via the brake flag 76) when in the engaged position. In some embodiments, the actuator 64 may be coupled to the housing 62 and may be located on a bottom surface of the housing 62. In certain embodiments, the actuator 64 may include a port 64A disposed on an outer surface of the actuator 64, which may couple to a control line, such as a pneumatic line, a hydraulic line, an electrical line, and so forth.

The actuator 64 may also include a rod 64B disposed at least partially through an aperture in the housing 62. The actuator 64 may actuate the rod 64B between a first position (e.g., a lower position) and a second position (e.g., an upper position). For example, the rod 64B may move substantially vertically between the first position and the second position. In certain embodiments, the actuator 64 may include a spring to bias the rod 64B towards the second position. Accordingly, the brake system 60 may be biased towards the engaged position such that the brake pads 68 may engage the brake flag 76 in case of a loss of power to the linear motor system 10. The rod 64B may be coupled to an activation wedge 66 that may move along with the rod 64B. For example, the rod 64B may be coupled to the activation wedge 66 such that as the rod 64B moves from the first position to the second position, the rod 64B may engage and may push against the activation wedge 66 and the rod 64B may push the activation wedge 66 upwards in an interior of the housing 62, toward the brake flag 76.

The activation wedge 66 may be disposed within an interior of the housing 62. The activation wedge 66 may move between a first position (e.g., a lower position) and a second position (e.g., an upper position) and the activation wedge 66 may engage and move the one or more brake pads 68. For example, the activation wedge 66 may include a tapered surface 66A that may engage a corresponding tapered surface 68A of the one or more brake pads 68. As the activation wedge 66 moves from the first position to the second position, the tapered surface 66A may engage with and move along the tapered surface 68A of the one or more brake pads 68, applying a force to move the one or more brake pads 68 laterally inward in the housing 62 towards the brake flag 76. For example, a flat surface 68B of the one or more brake pads 68 may engage the brake flag 76, such that the friction between the brake pads 68 and the brake flag 76 holds the mover 18 in place along the track. The brake pads 68 may be disposed within the interior of the housing 62. In some embodiments, the one or more brake pads 68 may be formed of a material having a high coefficient of friction with the brake flag 76, such as a rubber material, a cork material, and so forth. Additionally or alternatively, the flat surface 68B may include a coating, such as a high friction coating to assist in engaging the brake flag 76 and retaining the mover 18 in place. The brake system 60 may also include any number of bearings, such as needle bearings 70, between the tapered surface 66A of the activation wedge and the tapered surface 68A of the brake pads 68. For example, the needle bearings 70 may be at least partially disposed in the activation wedge 66 and may be coupled to the activation wedge 66. The needle bearings 70 may permit the tapered surface 66A of the activation wedge 66 to slide along the tapered surface 68A of the brake pads 68. Additionally or alternatively, the spring of the actuator 64 may bias the activation wedge 66 towards the first position via the coupling with the rod 64B.

With the foregoing in mind, FIG. 3 illustrates a cross-sectional view of another embodiment of the brake system 60, in accordance with embodiments of the present disclosure. For clarity purposes, some of the components of the brake system 60 may not be shown in FIG. 3. The brake pads 68 may be coupled to the housing 62 by one or more guide pins 72. The guide pins 72 may guide the brake pads 68 laterally inwards towards a center of the housing 62. For example, the guide pins 72 may be at least partially disposed through the housing 62 and/or through the brake pads 68 in the interior of the housing 62. The brake pads 68 may move along the guide pins 72 when moving between the engaged position and the disengaged position (shown). Additionally or alternatively, the brake system 60 may include any number of springs, such as return springs 74, to bias the brake pads 68 towards the disengaged position. For example, the return springs 74 may bias the brake pads 68 laterally away from the center of the housing 62 and away from engagement with the brake flag 76. Alternatively, the return springs 74 may bias the brake pads 68 towards the engaged position. A first end of the return springs 74 may be coupled to the housing 62 and a second end of the return springs 74 may be coupled to a corresponding brake pad 68. The return springs 74 may be disposed in the interior of the housing 62.

FIG. 4 is a diagrammatical representation of the linear motor system 10 showing one track section 36 and one mover 18 positioned along the track section 36. The track section 36 illustrated in FIG. 2 may be a straight or curved track section, these two differing in their physical configuration, and certain of the actual characteristics owing to the curved nature of the curved sections as discussed below. In general, however, each mover 18 may include a magnet array 38 on which a number of magnets 40 may be mounted. These magnets 40 may be permanent magnets and are mounted such that a small air gap is provided between the magnets 40 and coils of the track section 36. As shown in FIG. 2, the mover 18 may also include a sensor component 42, such as a permanent magnet. It should be noted, however, that the particular sensor component 42 included in the mover 18 may depend upon the nature of the sensing strategy, the sensing resolution, the position of the sensor 42 on the mover 18 (and cooperating components on the track section), and so forth. The platform 44 is provided on the mover 18 for mounting tools and the like as discussed above. Finally, bearings 46 and associated components (e.g., rollers) are mounted to the mechanical structure of the mover 18 and may serve to interact with one or more rails of the track 48. These bearings 46 and rails of the track 48 may allow the mover 18 to remain securely attached to the track section 36 while allowing relatively free movement of the movers 18 along the track section 36 and supporting mechanical loads and forces encountered during motion. The mover 18 may also include the brake flag 76. In certain embodiments, the brake flag 76 may be a thin sheet and may be formed of a metal material. For example, the brake flag 76 may include a first surface and a second surface facing in opposite directions. Each surface of the brake flag 76 may face and may engage a corresponding brake pad 68 of the brake system 60 when the brake pads 68 are moved to the engaged position. When the brake flag 76 is engaged by the brake pads 68, the mover 18 may be restricted from movement along the track section 36.

The track section 36 may include one or more brake systems 60 to hold the movers 18 in place. In certain embodiments, the brake systems 60 may include a sensor to sense a position of the actuator 64. For example, the sensor 78 may determine the brake system 60 is in an engaged position or a disengaged position with the brake flag 76 based on the position of the actuator 64. In some embodiments, the sensor 78 may generate and may transmit a signal to circuitry of the linear motor system 10, such as the power and control circuitry 28 and/or the remote control and/or monitoring circuitry 30, and the signal may provide a notification of a state (e.g., engaged, disengaged) of the brake system 60. Additionally or alternatively, the sensor 78 may sense a position of the brake flag 76 and may generate and transmit another signal to circuitry of the linear motor system 10. For example, the sensor 78 may generate a signal indicative of the brake flag 76 being positioned adjacent the brake system 60. Accordingly, the power and control circuitry 28 and/or the remote control and/or monitoring circuitry 30 may receive the signal and may generate and transmit a signal to operate the brake system 60. For example, the power and control circuitry 28 and/or the remote control and/or monitoring circuitry 30 may transmit a signal to the brake system 60 and may instruct the brake system 60 to move the brake pads 68 to the engaged position with the brake flag 76.

The track section 36 may also include a series of parallel coils 50 that are associated with a stator or armature 52. In currently contemplated embodiments, these coils 50 may be mounted into slots in the stator 52, and the stator 52 itself may be made of magnetic material formed into a stack of laminates and structured to allow for mounting within the track section 36 housing. Particular configurations, magnetic structures, mounting structures and the like of the coils 50 and stator 52 components are generally beyond the scope of the present disclosure. Drive circuitry 54 may be included in each track section 36 as discussed above to allow for controlled power signals to be applied to the coils 50 in order to drive and position the movers 18 appropriately around the track section 36. Additionally or alternatively, a sensor array 58 is provided in each track section 36 to allow for interaction with the sensor components 42 of the movers 18. This sensor array 58 may provide feedback that can indicate the position of the movers 18, and can be used to derive velocity, acceleration, jerk, and other motion parameters. In the illustrated embodiment, a number of track sections 36 may be mounted end-to-end and interconnected with one another and/or with the power and control circuitry 28 to received signals used to power the coils 50.

As will be appreciated by those skilled in the art, track sections 36, along with the magnet arrays 38 of the movers 18, may generally form what may be considered the linear motor system 10. That is, electromotive force is generated by the controlled fields of the coils 50 and interaction between these fields and the magnetic fields of the magnet array 38 serve to drive the mover 18 into desired positions, at desired speeds, and so forth. As noted above, these coils 50 and the linear motor itself may be designed in accordance with various configuration strategies, such as ones having the coils 50 arranged around a periphery of the track sections 36, ones in which the coils 50 are generally planar (in a top or bottom position of the sections 36), and so forth. Although the "linear" motor system 10 may be used in the present disclosure, it should be appreciated that curved sections in various configurations are intended to be included in the scope of the present disclosure.

In order to operate the brake systems 60, circuitry of the linear motor system 10 may instruct one or more of the brake systems 60 to engage the brake flags 76 of corresponding movers 18. For example, the power and control circuitry 28 and/or the remote control and/or monitoring circuitry 30 may generate and transmit an instruction to the drive circuitry 54 to cease operations of the linear motor system 10 (e.g., to stop the movers 18). Additionally or alternatively, the control circuitry 28, 30 may generate and transmit an instruction to one or more brake systems 60 to actuate the actuator 64 and move the brake pads 68 from the disengaged position to an engaged position with the brake flags 76 of the movers 18.

Figure 5:
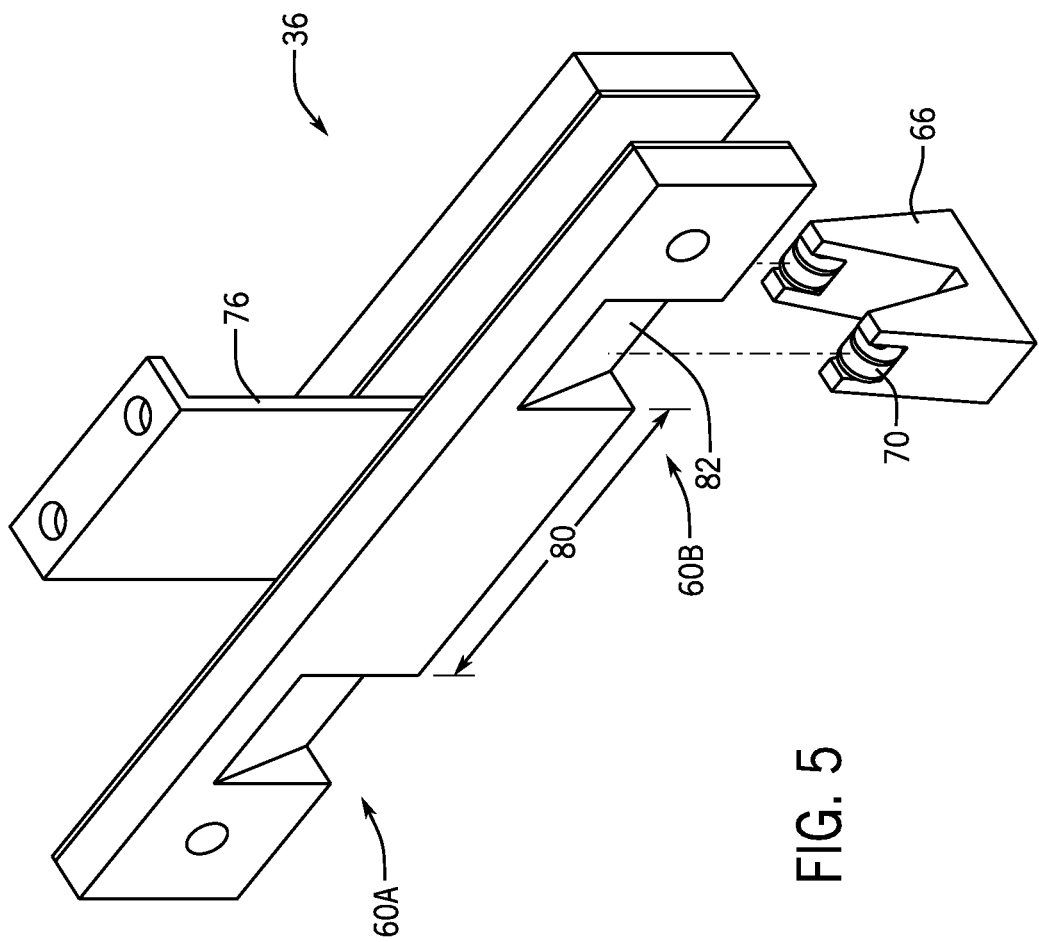
FIG. 5 is a perspective view of a track section of the linear motor systems of FIGS. 1A and 1B incorporating a number of brake systems, in accordance with embodiments described herein.

With the foregoing in mind, FIG. 5 illustrates a track section 36 incorporating a number of brake systems, such as brake systems 60A, 60B, in accordance with embodiments of the present disclosure. The brake systems 60A, 60B may be spaced apart along the track section 36 to ensure the brake flag 76 may be engaged by one of the brake systems 60A, 60B at any position along the track section 36. For example, the brake systems 60A, 60B may be installed and/or incorporated into the track section 36 at a distance 80 apart along the track section 36. The distance 80 may be selected based on a size of the brake flag 76 such that the brake pads of the brake systems 60A, 60B may engage at least a portion of the brake flag 76. For example, the distance 80 may be up to 90 percent of a size of the brake flag 76 (e.g., up to 50 percent, up to 60 percent, up to 75 percent, and so forth). In certain embodiments, the track section 36 may include a cutout 82 to receive one of the brake systems 60.

The present disclosure includes brake systems in track section of linear drive transport systems. The brake systems restrain movement of movers along the track section. Restraining the movement of the movers prevents the movers from unintended movement, such as on vertical track sections. Technical effects of the disclosed techniques include preventing damage due to unintended movement of movers of linear drive transport systems.

While only certain features of the disclosure have been illustrated and described herein, many modifications and changes will occur to those skilled in the art. It is, therefore, to be understood that the appended claims are intended to cover all such modifications and changes as fall within the true spirit of the present disclosure. The techniques presented and claimed herein are referenced and applied to material objects and concrete examples of a practical nature that demonstrably improve the present technical field and, as such, are not abstract, intangible, or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A brake system for a track section of a linear motor system, the brake system comprising:
    a housing configured to receive a brake flag of a mover of the linear motor system;
    a first brake pad disposed within the housing and comprising a first tapered surface, wherein the first brake pad is configured to move between a first position and a second position, wherein the first brake pad is configured to engage the brake flag of the mover of the linear motor system in the second position;
    a second brake pad disposed within the housing and comprising a second tapered surface, wherein the second brake pad is configured to move between a third position and a fourth position, wherein the second brake pad is configured to engage the brake flag of the mover of the linear motor system in the fourth position;
    a wedge disposed within the housing and comprising a third tapered surface configured to interface with the first tapered surface of the first brake pad and a fourth tapered surface configured to interface with the second tapered surface of the second brake pad; and
    an actuator configured to, in response to receiving a signal indicative of a loss of power to the linear motor system and receiving a signal indicative of a position of the brake flag, move the wedge between a fifth position and a sixth position, wherein movement of the wedge from the fifth position to the sixth position causes the first brake pad to move from the first position to the second position, and causes the second brake pad to move from the third position to the fourth position.

2. The brake system of claim 1, wherein the housing comprises a metal material.

3. The brake system of claim 1, wherein the first brake pad and the second brake pad comprise a rubber material, a cork material, or a combination thereof.

4. The brake system of claim 1, wherein each of the first brake pad and the second brake pad comprises a surface configured to engage the brake flag, wherein the surface includes a coating.

5. The brake system of claim 1, comprising a plurality of bearings disposed between the wedge, wherein each bearing of the plurality of bearings is configured to engage the first brake pad or the second brake pad.

6. The brake system of claim 5, wherein each bearing of the plurality of bearings comprises a needle bearing.

7. The brake system of claim 5, wherein a first bearing of the plurality of bearings is disposed between the first tapered surface of the first brake pad and the third tapered surface of the wedge, and wherein a second bearing is disposed between the second tapered surface of the second brake pad and the fourth tapered surface of the wedge.

8. The brake system of claim 1, comprising a sensor, wherein the sensor is configured to detect the position of the brake flag, wherein the sensor is configured to generate the signal indicative of the position of the brake flag.

9. The brake system of claim 1, wherein the actuator is one of a pneumatic cylinder, a hydraulic cylinder, a solenoid, a linear actuator, or any combination thereof.

10. The brake system of claim 1, wherein the actuator comprises a spring configured to bias the first brake pad towards the second position and configured to bias the second brake pad towards the fourth position.

11. A track section of a linear motor system, comprising:
a plurality of coils energizable to create a controlled magnetic field;
a housing configured to receive a brake flag of a mover of the linear motor system;
a sensor configured to detect a position of the brake flag of the mover;
power and control circuitry configured to detect a power status of the linear motor system;
a first brake pad disposed within the housing and comprising a first tapered surface, wherein the first brake pad is configured to move between a first position and a second position, wherein the first brake pad is configured to engage the brake flag of the mover of the linear motor system in the second position;
a second brake pad disposed within the housing and comprising a second tapered surface, wherein the second brake pad is configured to move between a third position and a fourth position, wherein the second brake pad is configured to engage the brake flag of the mover of the linear motor system in the fourth position;
a wedge disposed within the housing and comprising a third tapered surface configured to interface with the first tapered surface of the first brake pad and a fourth tapered surface configured to interface with the second tapered surface of the second brake pad; and
an actuator configured to, in response to receiving a signal from the power and control circuitry indicative of a loss of power to the linear motor system, and receiving a signal from a sensor indicative of a position of the brake flag move the wedge between a fifth position and a sixth position in response to, and, wherein movement of the wedge from the fifth position to the sixth position causes the first brake pad to move from the first position to the second position, and causes the second brake pad to move from the third position to the fourth position.

12. The track section of claim 11, wherein the housing comprises a metal material.

13. The track section of claim 11, wherein the first brake pad and the second brake pad comprise a rubber material, a cork material, or a combination thereof.

14. The track section of claim 11, wherein each of the first brake pad and the second brake pad comprises a surface configured to engage the brake flag, wherein the surface includes a coating.

15. The track section of claim 11, wherein the actuator is one of a pneumatic cylinder, a hydraulic cylinder, a solenoid, a linear actuator, or any combination thereof.

16. The track section of claim 11, wherein the actuator comprises a spring configured to bias the first brake pad towards the second position and configured to bias the second brake pad towards the fourth position.

17. A method, comprising:
detecting a loss of power via power and control circuitry;
detecting a position of a brake flag of a mover via a sensor;
in response to detecting the loss of power and based on the position of the brake flag of the mover, operating an actuator to move a portion of the actuator between a first position and a second position;
moving a wedge between a third position and a fourth position, wherein movement of the portion of the actuator from the first position to the second position causes the wedge to move from the third position to the fourth position; and
moving a first brake pad between a fifth position and a sixth position and a second brake pad between a seventh position and an eighth position, wherein movement of the wedge from the third position to the fourth position causes the first brake pad to move from the fifth position to the sixth position and causes the second brake pad to move from the seventh position to the eighth position, wherein the first brake pad engages the brake flag of the mover in the sixth position, and wherein the second brake pad engages the brake flag in the eighth position.

18. The method of claim 17, comprising:
biasing the first brake pad towards the fifth position; and
biasing the second brake pad towards the seventh position.

19. The method of claim 17, comprising biasing the portion of the actuator towards the first position.

20. The method of claim 17, comprising generating a signal indicative of the position of the brake flag.

* * * * *